No. 841,730. PATENTED JAN. 22, 1907.
C. W. SMITH.
FISHING LINE REEL.
APPLICATION FILED DEC. 18, 1905.
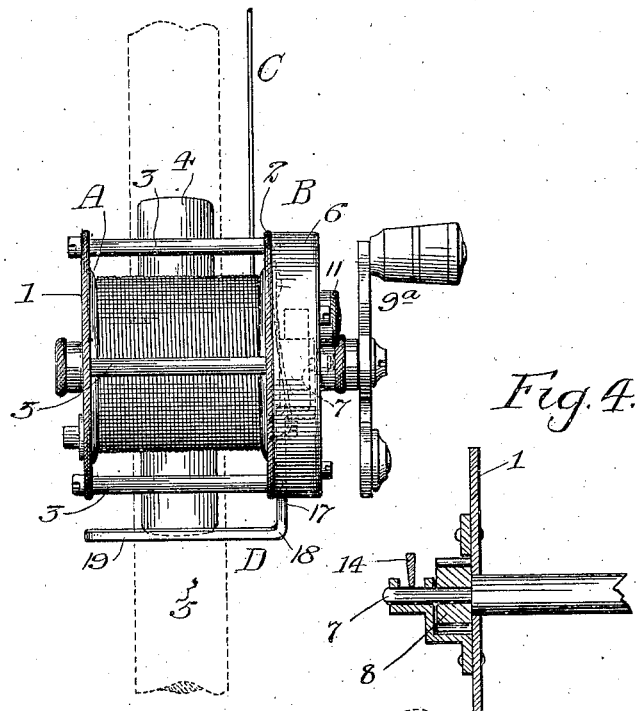
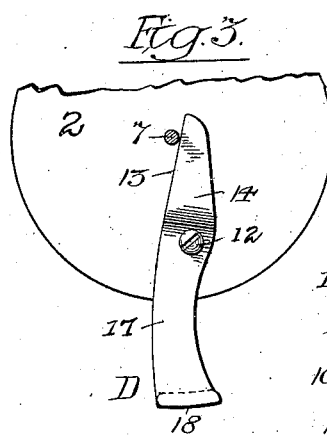
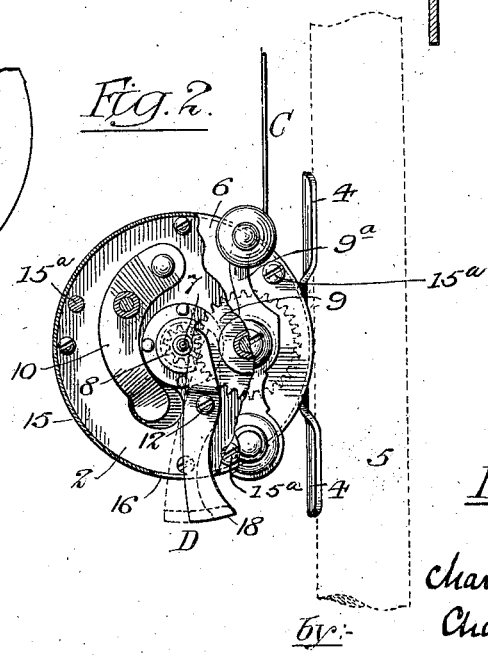

UNITED STATES PATENT OFFICE.

CHARLES W. SMITH, OF CHICAGO, ILLINOIS.

FISHING-LINE REEL.

No. 841,730.   Specification of Letters Patent.   Patented Jan. 22, 1907.

Application filed December 18, 1905. Serial No. 292,192.

*To all whom it may concern:*

Be it known that I, CHARLES W. SMITH, a citizen of the United States, residing at Chicago, in the county of Cook and State of Illinois, have invented certain new and useful Improvements in Fishing-Line Reels, of which the following is a specification.

My invention relates to fishing-line reels of the kind or class in which the reel is provided with a drag for checking the rotation of the reel, so as to prevent the spool from overrunning and tangling the line in casting.

Objects of my invention are to provide an exceedingly simple, cheap, and convenient drag device; to adapt said drag device for retarding the rotation of the spool and at the same time to render said drag incapable of locking or positively holding the spool against rotation; to permit the drag device to be conveniently operated by the operator's thumb, which with a very slight movement may change its application from the drag device to the coil of line upon the spool; to dispense with all need of springs, and to provide an extremely efficient drag device.

In the accompanying drawings, Figure 1 is a side elevation of a fishing-line reel with my improved drag device applied thereto. Fig. 2 is an end elevation with a portion of the end cap 6 broken away so as to expose a portion of the end plate 2. In this figure the exposed part of the flange portion 15 of cap 6 is in section on a plane transverse to the axis of the spool and parallel with and contiguous to the parts 14 and 17 of lever D, so as to show a slot or gap 16 formed in flange 15 for part 17 of the lever which extends through said slot or gap. Fig. 3 is a detail illustrating one of the reel pivots or journals in cross-section and the drag-lever engaging said pivot or journal, the drag-lever being shown as in Fig. 2, a portion of the end plate 2, to which said lever is pivoted, being also shown. Fig. 4 is a view of a portion of the reel, showing the arm 14 in cross-section.

The spool A is journaled within the frame B and is shown with a fishing-line C wound upon it in the usual way. The frame B comprises the end plates 1 and 2 and the usual tie-rods 3, by which these end plates are connected. The tie-rods are arranged parallel with the axis of the spool, and the reel-frame thus constructed is provided with a grooved back plate 4, adapted to fit against a fishing-pole. (Illustrated by dotted lines 5.) The spool is journaled in the end plates 1 and 2, the end plate 2 being in Fig. 1 covered by a cap-plate 6, while in Fig. 2 the cap-plate 6 is partially broken away so as to expose the end plate and one of the small journals 7 of the spool. A small gear 8 (illustrated in dotted lines in Fig. 2) is secured upon one of the small journals of the spool—for example, upon the journal 7. This gear 8 is engaged by a larger gear 9, the latter being turned by a crank-handle 9ª when it is desired to rotate the spool in a direction to wind up the line. It is also understood that the reel is provided with a brake device 10 and a slide device 11 for operating the brake device 10, the details of such brake means being immaterial, as any common or suitable brake device for positively holding the spool against rotation can be employed.

My improved drag device D consists of a bent lever pivoted to one of the cheeks or end plates of the frame, as at 12, Fig. 2, the lever being thus pivoted and arranged so that when it is desired to retard the rotation of the spool sufficiently to prevent it from overrunning and tangling the line the operator can move the lever, and thereby cause a portion of one longitudinal edge 13 of the short arm 14 of the lever to impinge against the cylindric surface of the small spool pivot or journal 7, as best shown in Fig. 3. The short arm 14 and a portion of the long arm of the lever D are parallel with the end plate 2 of the frame and covered by the end cap 6. The end cap 6 has the edge of its annular flange portion 15 fitted against the end plate 2, the cap being held in such position by screws 15ª. This annular flange portion of the cap 6 is provided with a slot 16, through which part 17 of the long arm of the lever D extends, the slot 16 being clearly illustrated in Fig. 2, in which a portion of the disk-shaped end of the cap is broken away, it being understood that the edge of the annular flange portion 6ª of the cap 6 is fitted against the end plate 2 and that the cap is secured to said plate by screws 15ª, the heads of a couple of such screws being seen in Fig. 2, where the disk-shaped end portion of the cap is not broken away, while as a result of a transverse section through the exposed part of the flange 15 in said figure one screw appears in cross-section. In this figure the exposed part of the flange 15 is thus shown in section in a plane contiguous to and parallel with parts 14 and 17 of lever D, so as to show the slot 16 and illustrate part 17 of the lever extending through such slot.

The lever D is bent as at 18, so as to provide it with an arm portion 19, extending under and parallel with the axis of the spool. As best shown in Fig. 2, the bent long arm of the lever depends from its pivot, whereby the transversely-extending arm portion will be in front of the back plate 4, and therefore in front of the pole, when the reel-frame is attached to the latter. The line C extends upwardly from the spool to the outer end of the pole, and the lever D depends from its pivot in an opposite direction, so that the operator while grasping the pole with one hand can employ the thumb of the same hand for pushing the long arm of the lever toward the pole, so as to cause the short arm of the lever to engage the spool-pivot 7, and, when so desired, the operator can remove such pressure from the lever and with a slight movement of the same thumb press on the coiled line upon the spool or simply rest his thumb on the reel-frame.

The impingement of the lever D on the spool pivot or journal does not and will not positively lock or hold the spool against rotation, and no matter how hard the operator may press the long arm of the lever toward the pole the frictional contact between an edge portion of the lever and one of the small pivots or journals of the spool will not be sufficient to lock the spool.

When the operator causes the drag-lever to thus bear upon one of the pivots or journals of the spool, it will be found that regardless of the degree of pressure which he may cause the drag-lever to exert upon the pivot or journal the spool will turn if the line is drawn with a very moderate degree of force in a direction to unwind it from the spool; but it will also be found that when the drag is thus applied as soon as the line slackens in casting such application of the drag will check the momentum of the spool, and thereby prevent the spool from overrunning and tangling the line or from "backlashing," as it is frequently called by fishermen.

The drag-lever D can obviously be made in one piece, and while its arm portion 19 can be round or flat or of other desired form in cross-section, its short arm 14 is preferably flattened so as to provide it with a suitable bearing edge 13, or at least provided with such limited bearing portion which engages the journal or pivot 7. When in casting the pole is brought into a position to incline upwardly and away from the user, the weight of the long arm of the drag-lever will cause the short arm of such lever to impinge against the spool pivot or journal 7; but this will not of itself retard the rotation of the reel by the unwinding of the line, it being understood that in order to retard the rotation of the reel, so as to check the momentum thereof, the operator must press upon the arm 19 of the drag-lever. This drag-lever is in no sense whatever a brake device, as it cannot be used for positively locking or holding the spool against rotation. This is due to the fact that when its arm portion 19 is depressed or moved back toward the pole by pressure applied thereon by the thumb of the fisherman the straight or substantially straight longitudinal edge portion 13 of the lever-arm 14 will be swung in a direction to be brought to impinge upon the small journal 7, which at the point of such impingement may be said to be of minimum diameter in contradistinction to a spindle having a small journal portion engaging in a bearing and having outside such bearing a diametrically-enlarged portion which is engaged by a brake-lever having an engaging face portion formed and extended to partially encircle and engage a considerable portion of the perimeter of such enlarged portion of the spindle after the manner of a brake-shoe. In accordance with my invention a brake-shoe or an approximation thereto is not practical. When the lever D is operated to retard the spool, the edge 13 engages journal 7 at a point only on the perimeter of the latter, and, conversely, the journal 7 engages edge 13 only at a point, thereby reducing the extent of frictional contact to the minimum.

What I claim as my invention is—

In a fishing-line reel, the combination with the frame comprising connected end plates, of the revoluble line-spool mounted in the frame and having a small cylindrical pivot or journal 7 extending through and projecting from the outer side of one of the end plates; and a drag-lever pivoted upon said end plate with its short arm arranged for engaging the pivot 7 and having its portion which thus engages the pivot formed as an edge which is tangential to the pivot when engaging the same, said short arm and a portion of the long arm of the drag-lever being alongside the plane of the end plate, and the long arm being bent at a point beyond the circumference of the end plate to form a transversely-extending arm portion relatively lower than the spool-axis and in position to be engaged by the thumb of a person using the reel in casting, said lever when engaging said journal having an extent of frictional contact therewith sufficient under manual pressure to arrest the momentum of the spool but insufficient under such pressure to lock or positively hold the spool against rotation.

CHARLES W. SMITH.

Witnesses:
CHARLES G. PAGE,
OTTILIE C. FREIBERG.